US012506654B2

(12) United States Patent
Velez et al.

(10) Patent No.: US 12,506,654 B2
(45) Date of Patent: Dec. 23, 2025

(54) PRE-BUILD VALIDATION OF DISTRIBUTED DISAGGREGATED WHITE BOX ROUTING SYSTEMS

(71) Applicant: AT&T Intellectual Property I, L.P., Atlanta, GA (US)

(72) Inventors: John Velez, Osprey, FL (US); Michael Vitella, Freehold, NJ (US); Rutesh Narielwala, Feasterville Trevose, PA (US); Ian Ricard, Ortonville, MI (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 498 days.

(21) Appl. No.: 18/058,789

(22) Filed: Nov. 25, 2022

(65) Prior Publication Data

US 2024/0179047 A1     May 30, 2024

(51) Int. Cl.
   *H04L 41/0686*    (2022.01)
   *H04L 41/0677*    (2022.01)
   *H04L 49/55*      (2022.01)

(52) U.S. Cl.
   CPC ...... *H04L 41/0686* (2013.01); *H04L 41/0677* (2013.01); *H04L 49/555* (2013.01)

(58) Field of Classification Search
   CPC ............ H04L 41/0686; H04L 41/0677; H04L 49/555
   See application file for complete search history.

(56) References Cited

U.S. PATENT DOCUMENTS 7,397,385 B1 * 7/2008 Bajpay ............... H04L 41/0677
                                                      340/650
9,372,770 B2    6/2016 Gururaj et al.
                (Continued)

FOREIGN PATENT DOCUMENTS

CN          113010432 A  *  6/2021 ............. G06F 11/36

OTHER PUBLICATIONS

Cai et al. "White Box Simulation Test Method and System Based on Flow Time Sequence Playback", CN 113010432 A, Jun. 22, 2021, 15 Pages (Year: 2021).*

(Continued)

*Primary Examiner* — Brian J. Gillis
*Assistant Examiner* — Chhian (Amy) Ling

(57) ABSTRACT

Methods, computer-readable media, and systems for performing pre-build validation of distributed disaggregated white box routing systems are disclosed. One method includes connecting, via a physical network connection, to a distributed, disaggregated white box routing system comprising a plurality of hardware components connected by a plurality of cable connections and a plurality of interfaces, executing a software program simulating a network operating system of a network operator, analyzing, while the software program is executing and the distributed, disaggregated white box routing system is connected via the physical network connection, the plurality of hardware components, the plurality of cable connections, and the plurality of interfaces, determining that an error is detected in at least one of: the plurality of cable connections, the plurality of interfaces, or the plurality of hardware components of the distributed, disaggregated white box routing system, and generating a report showing at least one of: a location or a nature of the error.

20 Claims, 3 Drawing Sheets

(56) References Cited

U.S. PATENT DOCUMENTS

| | | | |
|---|---|---|---|
| 11,582,297 B1* | 2/2023 | Gopalarathnam | H04L 67/1057 |
| 2017/0270236 A1* | 9/2017 | Yamaura | G06F 30/20 |
| 2018/0025299 A1* | 1/2018 | Kumar | G06F 3/0664 |
| 2020/0077129 A1* | 3/2020 | Jones | H04N 21/812 |
| 2022/0052845 A1* | 2/2022 | Sherf | H04L 9/0894 |
| 2022/0060476 A1* | 2/2022 | Hasek | H04L 63/164 |
| 2023/0198834 A1* | 6/2023 | Sandler | H04L 41/0806 709/223 |

OTHER PUBLICATIONS

Technology Blog, "AT&T Deploys Dis-Aggregated Core Router White Box with DriveNets Network Cloud software", 15 Pages, Sep. 28, 2022. (Year: 2022).*

* cited by examiner

PRE-BUILD VALIDATION OF DISTRIBUTED DISAGGREGATED WHITE BOX ROUTING SYSTEMS

The present disclosure relates generally to network architecture, and relates more particularly to devices, non-transitory computer-readable media, and methods for performing pre-build validation of distributed disaggregated white box routing systems.

BACKGROUND

White box networking provides the ability to deploy generic (i.e., non-proprietary), commodity off-the-shelf switches or routers with an independent network operating system (NOS) that drives Layer 2 and Layer 3 intelligence. White box switches and routers with independent NOSs can offer significant benefits in terms of cost and operational flexibility. For instance, white box routing systems can be deployed at cell tower locations in order to bring more flexible compute power to the network edge, where more and more data processing is expected to occur. Autonomous vehicles, augmented reality applications, and other low-latency applications that require mobility will rely on servers placed closer to the network endpoints rather than in remote data centers.

Distributed disaggregated white box routing systems can be very large in size, with over one hundred physical components (white boxes) being interconnected by hundreds of fiber optic connections.

SUMMARY

The present disclosure broadly discloses methods, computer-readable media, and systems for performing pre-build validation of distributed disaggregated white box routing systems. In one example, a method performed by a processing system including at least one processor includes connecting, via a physical network connection, to a distributed, disaggregated white box routing system comprising a plurality of hardware components connected by a plurality of cable connections and a plurality of interfaces, executing a software program simulating a network operating system of a network operator, analyzing, while the software program is executing and the distributed, disaggregated white box routing system is connected via the physical network connection, the plurality of hardware components, the plurality of cable connections, and the plurality of interfaces, determining that an error is detected in at least one of: the plurality of cable connections, the plurality of interfaces, or the plurality of hardware components of the distributed, disaggregated white box routing system, and generating a report showing at least one of: a location or a nature of the error.

In another example, a non-transitory computer-readable medium may store instructions which, when executed by a processing system including at least one processor, wherein the processing system being connected, via a physical network connection, to a distributed, disaggregated white box routing system comprising a plurality of hardware components connected by a plurality of cable connections and a plurality of interfaces, cause the processing system to perform operations. The operations may include executing a software program simulating a network operating system of a network operator, analyzing, while the software program is executing and the distributed, disaggregated white box routing system is connected via the physical network connection, the plurality of hardware components, the plurality of cable connections, and the plurality of interfaces, determining that an error is detected in at least one of: the plurality of cable connections, the plurality of interfaces, or the plurality of hardware components of the distributed, disaggregated white box routing system, and generating a report showing at least one of: a location or a nature of the error.

In another example, a device may include a processing system including at least one processor, wherein the processing system being connected, via a physical network connection, to a distributed, disaggregated white box routing system comprising a plurality of hardware components connected by a plurality of cable connections and a plurality of interfaces, and a non-transitory computer-readable medium storing instructions which, when executed by the processing system, cause the processing system to perform operations. The operations may include executing a software program simulating a network operating system of a network operator, analyzing, while the software program is executing and the distributed, disaggregated white box routing system is connected via the physical network connection, the plurality of hardware components, the plurality of cable connections, and the plurality of interfaces, determining that an error is detected in at least one of: the plurality of cable connections, the plurality of interfaces, or the plurality of hardware components of the distributed, disaggregated white box routing system, and generating a report showing at least one of: a location or a nature of the error.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

Figure 1:
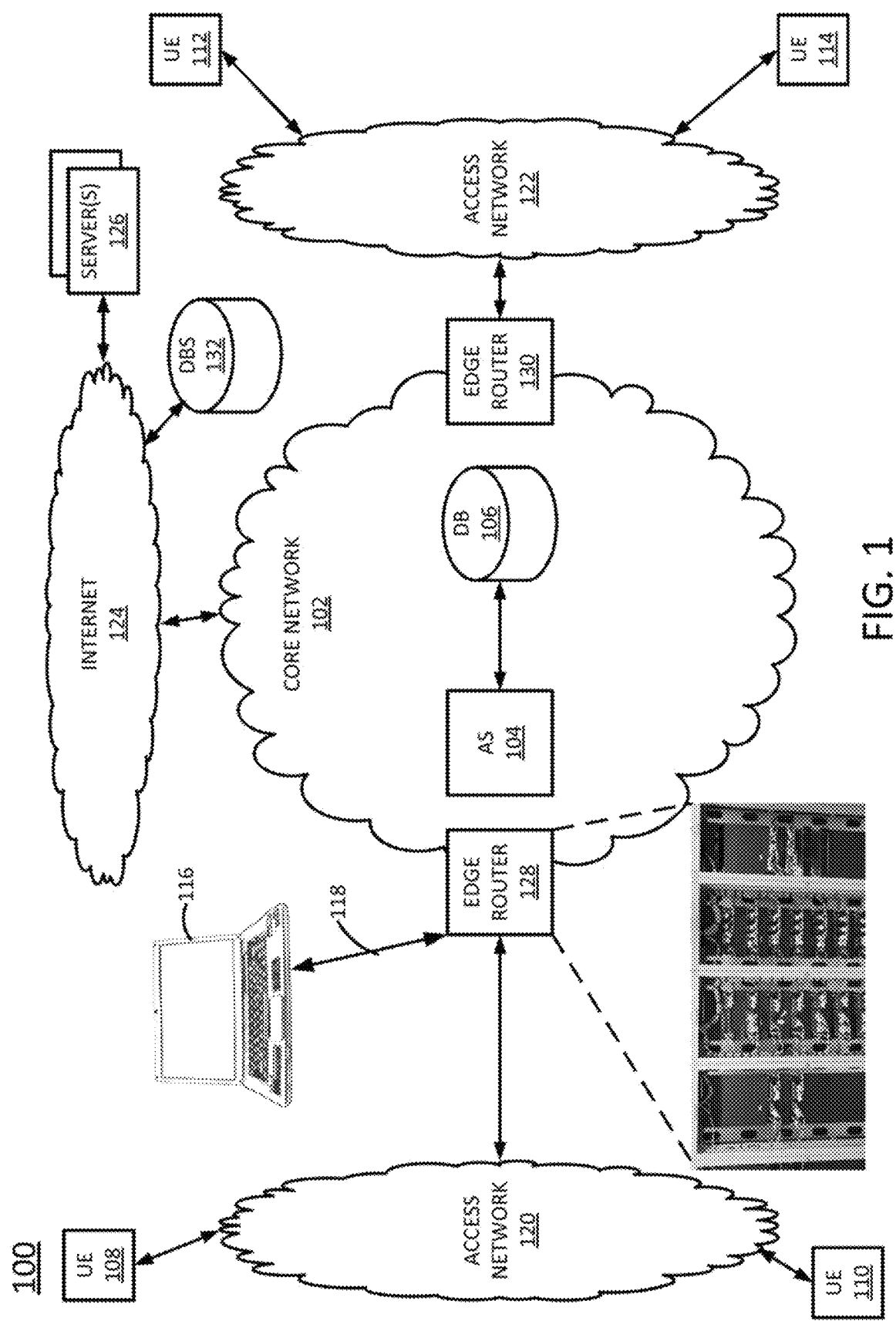
FIG. 1 illustrates an example system in which examples of the present disclosure for performing pre-build validation of distributed disaggregated white box routing systems may operate.

The present disclosure broadly discloses methods, computer-readable media, and systems for performing pre-build validation of distributed disaggregated white box routing systems. White box networking provides the ability to deploy generic (i.e., non-proprietary), commodity off-the-shelf switches or routers with an independent network operating system (NOS) that drives Layer 2 and Layer 3 intelligence. White box switches and routers with independent NOSs can offer significant benefits in terms of cost and operational flexibility. For instance, white box routing systems can be deployed at cell tower locations in order to bring more flexible compute power to the network edge, where more and more data processing is expected to occur. Autonomous vehicles, augmented reality applications, and other low-latency applications that require mobility will rely on servers placed closer to the network endpoints rather than in remote data centers.

Distributed disaggregated white box routing systems can be very large in size, with over one hundred physical components (white boxes) being interconnected by hundreds of fiber optic connections. As such, one of the biggest challenges in constructing a distributed disaggregated white box routing system is ensuring the integrity of the fiber optic interconnection links. During a typical deployment, after the physical installation of the system is completed, technicians will download the NOS into the system management modules, which in turn distribute the NOS to all system components and attempt to spin up the routing system. It is common during this phase to discover issues with the optical fibers, optical interfaces, and/or physical components which were not discoverable during the physical installation, because such issues are not apparent until the NOS is loaded.

During a conventional roll out of a distributed disaggregated white box routing system, errors in physical installation may cause an average delay of approximately twenty installation days once the equipment verification testing (EVT) phase has started. Since a typical installation day may cost approximately $2,500, a delay of this magnitude may cost a network operator as much as $50,000. For a typical Tier 2 or Tier 3 network operator that may deploy fifty or more of such routing systems per year, this translates into approximately $2.5 million. For Tier 1 network operators, the costs may be exponentially higher.

Examples of the present disclosure provide an air-gapped, hardened portable computing device (e.g., a laptop or tablet computer) that simulates a network operator's control and management network in order to monitor the fiber optic interconnection links of a distributed disaggregated white box routing system while the routing system is under construction (e.g., being cabled), without violating network security and integrity. This disclosed approach enables temporary on-site loading of NOS software and associated firmware packages prior to network interconnection. With the NOS software loaded, the routing system can discover and validate the internal cabling and allow technicians to see the connectivity in near-real time. Once the routing system is fully connected and all interconnections have been validated, the temporary NOS can be removed, leaving the routing system in a state that is ready to connect to the network operator's actual control and management network following routine, secure turn-up guidelines.

By detecting errors in the physical installations prior to the start of formal EVT, a network operator may be able to significantly reduce the number of installation days lost and therefore minimize the costs associated with such losses to tens of thousands of dollars, as opposed to millions, over the span of a year. These and other aspects of the present disclosure are discussed in greater detail below in connection with the examples of FIGS. 1-3.

To further aid in understanding the present disclosure, FIG. 1 illustrates an example system 100 in which examples of the present disclosure for performing pre-build validation of distributed disaggregated white box routing systems may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VOIP) telephony services. In one example, the core network 102 may include at least one application server (AS) 104, a database (DB) 106, and a plurality of edge routers 128-130. For ease of illustration, various additional elements of the core network 102 are omitted from FIG. 1.

In one example, the access networks 120 and 122 may comprise Digital Subscriber Line (DSL) networks, public switched telephone network (PSTN) access networks, broadband cable access networks, Local Area Networks (LANs), wireless access networks (e.g., an IEEE 802.11/Wi-Fi network and the like), cellular access networks, 3rd party networks, and the like. For example, the operator of the core network 102 may provide a cable television service, an IPTV service, or any other types of telecommunication services to subscribers via access networks 120 and 122. In one example, the access networks 120 and 122 may comprise different types of access networks, may comprise the same type of access network, or some access networks may be the same type of access network and other may be different types of access networks. In one example, the core network 102 may be operated by a telecommunication network service provider (e.g., an Internet service provider, or a service provider who provides Internet services in addition to other telecommunication services). The core network 102 and the access networks 120 and 122 may be operated by different service providers, the same service provider or a combination thereof, or the access networks 120 and/or 122 may be operated by entities having core businesses that are not related to telecommunications services, e.g., corporate, governmental, or educational institution LANs, and the like.

In one example, the access network 120 may be in communication with one or more user endpoint devices (UEs) 108 and 110. Similarly, the access network 122 may be in communication with one or more user endpoint devices 112 and 114. The access networks 120 and 122 may transmit and receive communications between the user endpoint devices 108, 110, 112, and 114, between the user endpoint devices 108, 110, 112, and 114, the server(s) 126, the AS 104, other components of the core network 102, devices reachable via the Internet in general, and so forth. In one example, each of the user endpoint devices 108, 110, 112, and 114 may comprise any single device or combination of devices that may comprise a user endpoint device, such as computing system 300 depicted in FIG. 3, and may be configured as described below. For example, the user endpoint devices 108, 110, 112, and 114 may each comprise a mobile device, a cellular smart phone, a gaming console, a set top box, a laptop computer, a tablet computer, a desktop computer, an autonomous vehicle, an extended reality (XR) device, an application server, a bank or cluster of such devices, and the like.

The AS 104 may cooperate with a software client running on one or more of the user endpoint devices 108, 110, 112, and 114 to provide one or more services to the user endpoint devices 108, 110, 112, and 114. For instance, the AS 104 may host an application that provides streaming media (e.g., streaming video or music) services, that provides an extended reality (e.g., virtual reality, mixed reality, augmented reality, and or the like) video game or other application, or provides another service. Providing the service may, in some examples, involve retrieving data (e.g., video files, audio files, or the like) from the DB 106.

In one example, one or more of the servers 126 and one or more of the databases (DBs) 132 may be accessible to user endpoint devices 108, 110, 112, and 114 and to the AS 104 via Internet 124 in general. The server(s) 126 and DBs 132 may operate in a manner similar to the AS 104 and DB 106, as described in further detail below.

Figure 3:
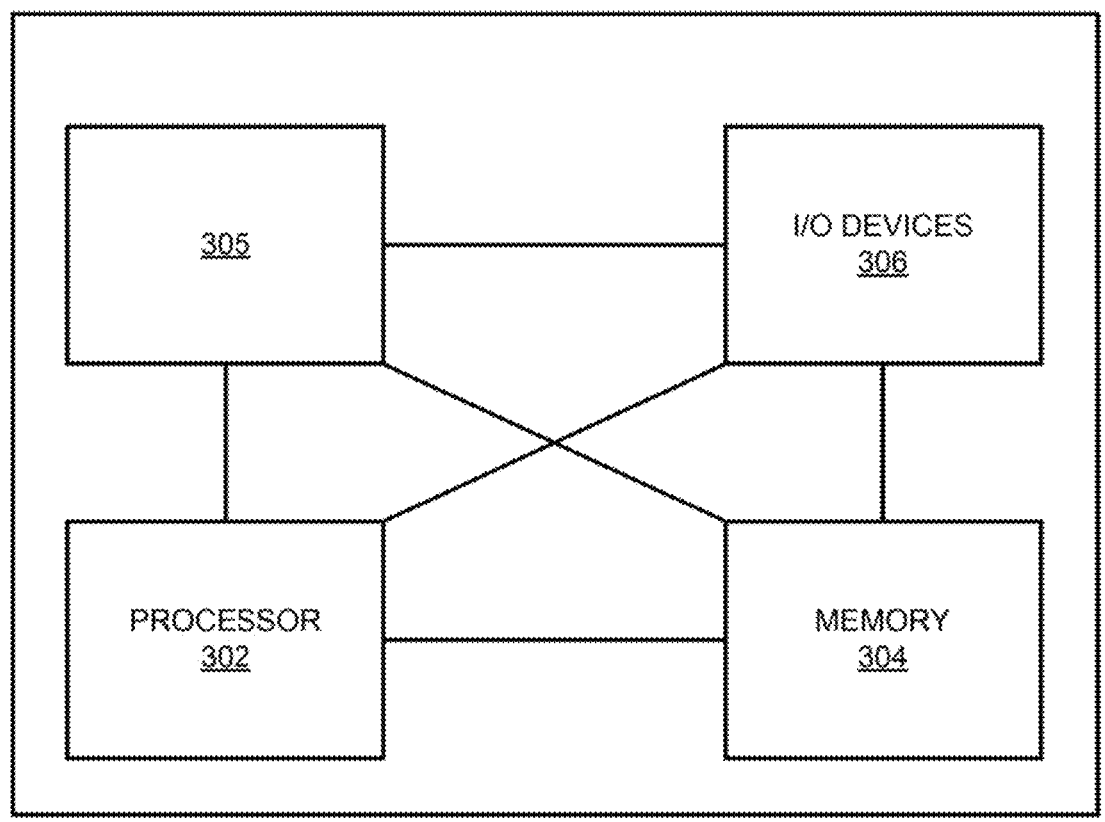
FIG. 3 illustrates an example of a computing device, or computing system, specifically programmed to perform the steps, functions, blocks, and/or operations described herein.

The AS 104 may comprise one or more physical devices, e.g., one or more computing systems or servers, such as computing system 300 depicted in FIG. 3, and may be configured as described below. It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure.

In one example, the DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute instructions for providing a service to user endpoint devices 108, 110, 112, and 114.

In one example, one or more of the edge routers 128 and 130 may comprise a distributed, disaggregated routing system. Taking edge router 128 as an example, the distributed, disaggregated white box routing system may comprise a plurality of hardware components connected by a plurality of cable connections and a plurality of interfaces. In one example, the plurality of hardware components may comprise a plurality of generic (i.e., not proprietary), off-the-shelf modules. These modules may include one or more of: network cloud packet forwarder (NCP) modules, network cloud fabric (NCF) modules, network cloud controller (NCC) modules, or network configuration management (NCM) modules.

As discussed above, one of the biggest challenges in constructing a distributed disaggregated white box routing system is ensuring the integrity of the fiber optic interconnection links. In one example, a portable computing system 116 (e.g., a laptop computer, a tablet computer, or the like) may be connected to the distributed, disaggregated routing system via a physical network connection 118. The portable computing system 116 may comprise a single-purpose tool that performs a single function, i.e., to run a software program that simulates a network operator's disaggregated NOS (or dNOS). The basic input/output system (BIOS) settings and configurations of the portable computing device 116 may be configured to disable access to all other functions of the portable computing device 116 (i.e., such that running the software program that simulates the dNOS is the only function the portable computing device 116 is capable of performing without being reconfigured). For instance, WiFi and Bluetooth may be disabled, as well as wake-on local area network (LAN), camera, global positioning system (GPS), secure boot mode, and other ancillary equipment. This ensures that the physical network connection 118 between the portable computing device 116 and the distributed, disaggregated white box routing system is secure and not vulnerable to outside threats. The internal Ethernet port of the portable computing device 116 may remain enabled.

Moreover, the BIOS settings and configurations of the portable computing device 116 may be configured to impose specific guidelines on a human technician for connecting the portable computing device 116 to the distributed, disaggregated white box routing system. For instance, the BIOS settings and configurations may be configured to guide the technician in making the physical (e.g., wired) network connections between the portable computing device 116 and the distributed, disaggregated white box routing system. In other words, the BIOS settings and configurations may be configured to instruct the technician as to which ports of the portable computing device 116 and which ports of the distributed, disaggregated white box routing system should be connected by which wired connections. One example method for performing pre-build validation of distributed disaggregated white box routing systems, such as may be performed by the portable computing device 116 once properly connected to the distributed, disaggregated white box routing system, is described in greater detail below in connection with FIG. 2.

In one example, the physical network connection 118 illustrated in FIG. 1 represents a plurality of individual cabled connections, one or more of which may include a switch. For instance, in one example, the integrated lights-out (ILO) and management (MGT) ports 0 and 1 of an NCC module of the distributed, disaggregated white box routing system may be disconnected from other switches. Dynamic host configuration protocol (DHCP) may be turned off on the NCC module, and a static IP address may be set up for the NCC's iLO ports via universal serial bus (USB) ports on the NCC to a monitor and keyboard of the portable computing device 116. A static IP address may also be set up for the NCC's MGT port 0 via Terminal on the portable computing device 116. The integrated lights-out (ILO) and management (MGT) ports 0 and 1 of an NCC module may then be connected to the portable computing device 116 via an Ethernet switch.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements.

For example, the system 100 may include other network elements (not shown) such as border elements, routers, switches, policy servers, security devices, gateways, a content distribution network (CDN) and the like. For example, portions of the core network 102, access networks 120 and 122, and/or Internet 124 may comprise a content distribution network (CDN) having ingest servers, edge servers, and the like. Similarly, although only two access networks, 120 and 122 are shown, in other examples, access networks 120 and/or 122 may each comprise a plurality of different access networks that may interface with the core network 102 independently or in a chained manner. For example, UE devices 108, 110, 112, and 114 may communicate with the core network 102 via different access networks, user endpoint devices 110 and 112 may communicate with the core network 102 via different access networks, and so forth. Thus, these and other modifications are all contemplated within the scope of the present disclosure.

Figure 2:
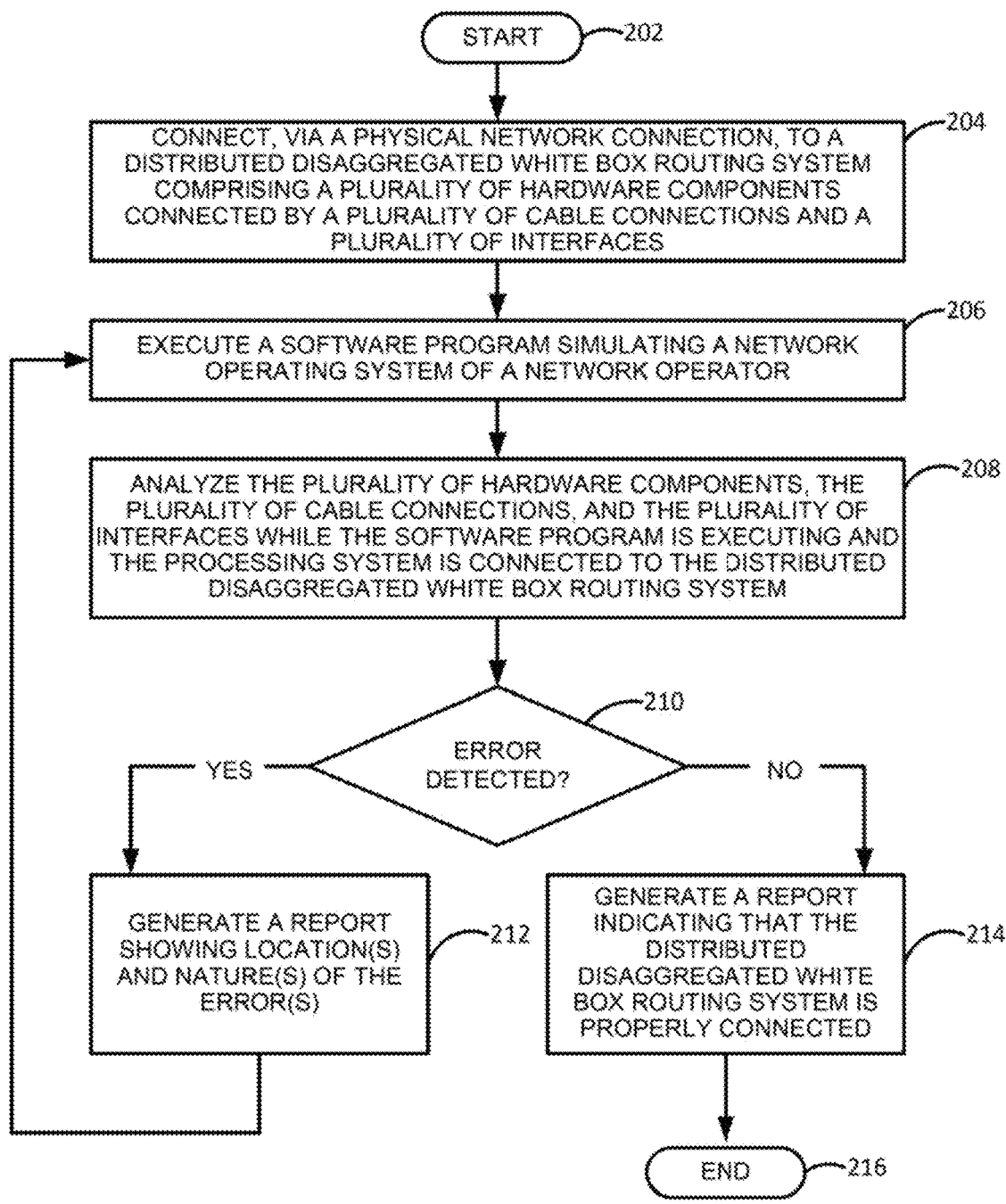
FIG. 2 illustrates a flowchart of an example method for performing pre-build validation of distributed disaggregated white box routing systems, according to examples of the present disclosure.

FIG. 2 illustrates a flowchart of an example method 200 for performing pre-build validation of distributed disaggregated white box routing systems, in accordance with the present disclosure. In one example, steps, functions and/or operations of the method 200 may be performed by a device as illustrated in FIG. 1, e.g., a portable computing device 116 or any one or more components thereof. In another example, the steps, functions, or operations of method 200 may be performed by a computing device or system 300, and/or a processing system 302 as described in connection with FIG. 3 below. For instance, the computing device 300 may represent at least a portion of portable computing device 116 in accordance with the present disclosure. For illustrative purposes, the method 200 is described in greater detail below in connection with an example performed by a processing system, such as processing system 302.

The method 200 begins in step 202 and proceeds to step 204. In step 204, the processing system may connect, via a physical network connection, to a distributed, disaggregated white box routing system comprising a plurality of hardware components connected by a plurality of cable connections and a plurality of interfaces.

In one example, the processing system is part of an air-gapped, hardened portable computing device (e.g., a laptop computer, a tablet computer, or the like). In one example, the portable computing device comprises a single-purpose tool that performs a single function, i.e., to run a software program that simulates a network operator's disaggregated NOS (or dNOS). The basic input/output (BIOS) settings and configurations of the portable computing device may be configured to disable access to all other functions of the portable computing device (i.e., such that running the software program that simulates the dNOS is the only function the portable computing device is capable of performing without being reconfigured). This ensures that the connections between the processing system and the distributed, disaggregated white box routing system are secure and not vulnerable to outside threats.

Moreover, the BIOS settings and configurations of the portable computing device may be configured to impose specific guidelines on a human technician for connecting the processing system to the distributed, disaggregated white box routing system. For instance, the BIOS settings and configurations may be configured to guide the technician in making the physical (e.g., wired) network connections between the portable computing device and the distributed, disaggregated white box routing system. In other words, the BIOS settings and configurations may be configured to instruct the technician as to which ports of the portable computing device and which ports of the distributed, disaggregated white box routing system should be connected by which wired connections.

As discussed above, the distributed, disaggregated white box routing system comprises a plurality of hardware components connected by a plurality of cable connections and a plurality of interfaces. In one example, the plurality of hardware components may comprise a plurality of generic (i.e., not proprietary), off-the-shelf modules. These modules may include one or more of: network cloud packet forwarder (NCP) modules, network cloud fabric (NCF) modules, network cloud controller (NCC) modules, or network configuration management (NCM) modules. The plurality of cable connections may comprise fiber optic connections, and the plurality of interfaces may comprise optical interfaces.

In step 206, the processing system may execute a software program simulating a network operating system (NOS) of a network operator. As discussed above, the portable computing device of which the processing system is a part may be configured to perform a single function, i.e., to run the software program that simulates the dNOS. Once the processing system is properly connected to the distributed, disaggregated white box routing system, the processing system may run the software program. Running the software program will cause a proxy dNOS to be distributed to the plurality of hardware components. In one example, running the software program may replicate what is referred to as a "call home" operation. In one example, it may take up to two hours to load the dNOS to the distributed, disaggregated white box routing system.

In step 208, the processing system may analyze the plurality of hardware components, the plurality of cable connections, and/or the plurality of interfaces while the software program is executing and the processing system is connected to the distributed, disaggregated white box routing system.

For instance, while the software program is executing, the processing system may be able to determine whether there are any errors in any of the cable connections of the plurality of cable connections (e.g., whether any cable connections of the plurality of cable connections are connected to the wrong hardware component of the plurality of hardware components and/or to the wrong port of one of the hardware components of the plurality of hardware components). In one example, if there are any errors in any of the cable connections, the proxy dNOS may fail to be properly distributed to some hardware components of the plurality of hardware components.

The processing system may also be able to determine whether any of the hardware components of the plurality of hardware components are running outdated firmware and/or operating systems, and whether any backplane interconnections are defective or unresponsive.

In step 210, the processing system may determine whether any errors are detected in the plurality of cable connections, the plurality of interfaces, or the plurality of hardware components of the distributed, disaggregated white box routing system. For instance, an error in the plurality of cable connections, the plurality of interfaces, or the plurality of hardware components may be detected in accordance with the analysis performed in step 208.

If the processing system concludes in step 210 that an error has been detected in at least one of: the plurality of cable connections, the plurality of interfaces, or the plurality of hardware components of the distributed, disaggregated white box routing system, then the method 200 may proceed to step 212.

In step 212, the processing system may generate a report showing the location(s) and/or nature(s) of the error(s). In one example, the report may identify, for instance, a specific cable connection of the plurality of cable connections that is improperly connected. The report may identify the ports to which the specific cable connection is connected, and may indicate which of these ports is incorrectly connected to the specific cable connection. In a further example, the report may specify the correct port(s) to which the specific cable connection should be connected, so that a technician may resolve the error.

The report may also identify, for instance, a specific hardware component of the plurality of hardware components that is running outdated firmware and/or outdated operating system, and may indicate the firmware and/or operating system that the specific hardware component should be running. In a further example, the report may identify a specific backplane interconnection that is determined to be defective or unresponsive, and may flag the backplane interconnection for replacement of cables and/or optics.

Once the report has been generated, the method 200 may return to step 206, and the processing system may repeat one or more of steps 206-210 as described above in order to determine whether any errors remain in the plurality of cable connections, the plurality of interfaces, or the plurality of hardware components of the distributed, disaggregated white box routing system. For instance, even though the report may have provided the technician with the information to correctly connect a specific cable connection, the technician may still have improperly connected the specific cable connection. Thus, by repeating steps 206-210, the processing system can verify that any recommended actions for resolving detected errors have been properly carried out.

In one example, any errors on the NCF and NCP modules may cause visible indicators on the NCF and NCP modules to appear. For instance, a red light emitting diode (LED) may illuminate on an NCF or NCP module that is malfunctioning, running out of date firmware or an out of date operating system or that is improperly connected. Alternatively, no light may illuminate on the NCF or NCP module (where the lack of illuminated indicator indicates an error). In some examples, a green LED may illuminate on a BCF or NCP module whose operation and connections have been validated.

If, on the other hand, the processing system concludes in step 210 that no errors have been detected in any of the plurality of cable connections, the plurality of interfaces, or the plurality of hardware components of the distributed, disaggregated white box routing system, then the method 200 may proceed to step 214.

In step 214, the processing system may generate an indication, e.g., a report indicating that the distributed, disaggregated white box routing system is properly connected.

In one example, step 214 may occur after one or more iterations of steps 206-212. For instance, as discussed above, errors may be detected in the plurality of cable connections, the plurality of interfaces, or the plurality of hardware components of the distributed, disaggregated white box routing system, and the processing system may guide a technician in resolving those errors. Repeating steps 206-210 may ensure that any attempts to resolve the errors were properly carried out. Thus, when the processing system generates the report indicating that the distributed, disaggregated white box routing system is properly connected, this indicates that any errors that were previously detected by prior iterations of steps 206-212 have been resolved.

Once the processing system has generated a report indicating that the distributed, disaggregated white box routing system is properly connected, the method 200 may end in step 216. Once the method 200 ends, the portable computing system may be disconnected from the distributed, disaggregated white box routing system, and the network operator's dNOS may be downloaded into the system management modules of the distributed, disaggregated white box routing system for distribution to the plurality of hardware components and for subsequent EVT, system verification testing (SVT), and/or network validation testing (NVT).

Thus, examples of the present disclosure provide an air-gapped, hardened portable computing device (e.g., a laptop or tablet computer) that simulates a network operator's control and management network in order to monitor the fiber optic interconnection links of a distributed disaggregated white box routing system while the routing system is under construction (e.g., being cabled), without violating network security and integrity. This disclosed approach enables temporary on-site loading of NOS software and associated firmware packages prior to network interconnection. With the NOS software loaded, the routing system can discover and validate the internal cabling and allow technicians to see the connectivity in near-real time. Once the routing system is fully connected and all interconnections have been validated, the temporary NOS can be removed, leaving the routing system in a state that is ready to connect to the network operator's actual control and management network following routine, secure turn-up guidelines.

By detecting errors in the physical installations prior to the start of formal EVT, a network operator may be able to significantly reduce the number of installation days lost and therefore minimize the costs associated with such losses to tens of thousands of dollars, as opposed to millions, over the span of a year.

It should be noted that the method 200 may be expanded to include additional steps or may be modified to include additional operations with respect to the steps outlined above. In addition, although not specifically specified, one or more steps, functions, or operations of the method 200 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

FIG. 3 depicts a high-level block diagram of a computing device or processing system specifically programmed to perform the functions described herein. As depicted in FIG. 3, the processing system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for performing pre-build validation of distributed disaggregated white box routing systems, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200 or the entire method 200 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 302 can also be configured or programmed to cause other devices to perform one or more operations as discussed above. In other words, the hardware processor 302 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one example, instructions and data for the present module or process 305 for performing pre-build validation of distributed disaggregated white box routing systems (e.g., a software program comprising computer-executable instructions) can be loaded into memory 304 and executed by hardware processor element 302 to implement the steps, functions, or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for performing pre-build validation of distributed disaggregated white box routing systems (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:
   connecting, by a processing system including at least one processor via a physical network connection, to a distributed, disaggregated white box routing system comprising a plurality of hardware components connected by a plurality of cable connections and a plurality of interfaces;
   executing, by the processing system, a software program simulating a network operating system of a network operator;
   analyzing, by the processing system while the software program is executing and the processing system is connected to the distributed, disaggregated white box routing system, the plurality of hardware components, the plurality of cable connections, and the plurality of interfaces;
   determining, by the processing system, that an error is detected in at least one of: the plurality of cable connections, the plurality of interfaces, or the plurality of hardware components of the distributed, disaggregated white box routing system; and
   generating, by the processing system, a report showing at least one of: a location or a nature of the error,
   wherein the connecting, the executing, the analyzing, the determining, and the generating are performed prior to a formal equipment verification testing of the distributed, disaggregated white box routing system.

2. The method of claim 1, wherein the processing system is part of an air-gapped, hardened portable computing device.

3. The method of claim 2, wherein basic input/output system settings and configurations of the air-gapped, hardened portable computing device are configured to disable access to all other functions of the air-gapped, hardened portable computing device except for the software program simulating the network operating system.

4. The method of claim 3, wherein the basic input/output system settings and configurations are further configured to impose guidelines for physically connecting the air-gapped, hardened portable computing device to the distributed, disaggregated white box routing system.

5. The method of claim 1, wherein the plurality of hardware components comprises a plurality of generic, off-the-shelf modules.

6. The method of claim 5, wherein the plurality of generic, off-the-shelf modules includes at least one of: a network cloud packet forwarder module, a network cloud fabric module, a network cloud controller module, or a network configuration management module.

7. The method of claim 5, wherein the plurality of cable connections comprises a plurality of fiber optic connections.

8. The method of claim 7, wherein the plurality of interfaces comprises optical interfaces.

9. The method of claim 1, wherein the executing causes a proxy disaggregated network operating system to be distributed to the plurality of hardware components.

10. The method of claim 1, wherein the executing simulates a call home operation.

11. The method of claim 1, wherein the error comprises a cable connection of the plurality of cable connections being connected to a wrong hardware component of the plurality of hardware components.

12. The method of claim 1, wherein the error comprises a cable connection of the plurality of cable connections being connected to a wrong port of a hardware component of the plurality of hardware components.

13. The method of claim 1, wherein the error comprises a hardware component of the plurality of hardware components running at least one of: an outdated firmware or an outdated operating system.

14. The method of claim 1, wherein the error comprises a backplane interconnection that is defective or unresponsive.

15. The method of claim 1, wherein the error causes the network operating system simulated by the software program to fail to be distributed to at least one hardware component of the plurality of hardware components.

16. The method of claim 1, wherein the report specifies a manner in which the error is to be resolved.

17. The method of claim 1, further comprising:
repeating the executing, the analyzing, and the determining after the report has been generated and at least one measure has been taken to attempt to resolve the error.

18. The method of claim 17, further comprising:
generating, by the processing system, a second report indicating that the distributed, disaggregated white box routing system is properly connected when all errors including the error have been resolved.

19. A non-transitory computer-readable medium storing instructions which, when executed by a processing system including at least one processor, wherein the processing system being connected, via a physical network connection, to a distributed, disaggregated white box routing system comprising a plurality of hardware components connected by a plurality of cable connections and a plurality of interfaces, cause the processing system to perform operations, the operations comprising:

executing a software program simulating a network operating system of a network operator;
analyzing, while the software program is executing and the distributed, disaggregated white box routing system is connected via the physical network connection, the plurality of hardware components, the plurality of cable connections, and the plurality of interfaces;
determining that an error is detected in at least one of: the plurality of cable connections, the plurality of interfaces, or the plurality of hardware components of the distributed, disaggregated white box routing system; and
generating a report showing at least one of: a location or a nature of the error,
wherein the executing, the analyzing, the determining, and the generating are performed prior to a formal equipment verification testing of the distributed, disaggregated white box routing system.

20. A device comprising:
a processing system including at least one processor, wherein the processing system being connected, via a physical network connection, to a distributed, disaggregated white box routing system comprising a plurality of hardware components connected by a plurality of cable connections and a plurality of interfaces; and
a non-transitory computer-readable medium storing instructions which, when executed by the processing system, cause the processing system to perform operations, the operations comprising:
executing a software program simulating a network operating system of a network operator;
analyzing, while the software program is executing and the distributed, disaggregated white box routing system is connected via the physical network connection, the plurality of hardware components, the plurality of cable connections, and the plurality of interfaces;
determining that an error is detected in at least one of: the plurality of cable connections, the plurality of interfaces, or the plurality of hardware components of the distributed, disaggregated white box routing system; and
generating a report showing at least one of: a location or a nature of the error,
wherein the executing, the analyzing, the determining, and the generating are performed prior to a formal equipment verification testing of the distributed, disaggregated white box routing system.

* * * * *